REMOTE CONTROL SYSTEM FOR TELEVISION RECEIVER

Filed Sept. 17, 1954 2 Sheets-Sheet 1

INVENTORS
JOHN N. GORTNER
CALVIN A. SIMS
BY
Lockwood, Galt, Woodard, & Smith
ATTORNEYS

REMOTE CONTROL SYSTEM FOR TELEVISION RECEIVER

Filed Sept. 17, 1954 2 Sheets-Sheet 2

INVENTORS
JOHN N. GORTNER
CALVIN A. SIMS
BY
Lockwood, Galt, Woodard, & Smith
ATTORNEYS United States Patent Office 2,887,529
Patented May 19, 1959

2,887,529

REMOTE CONTROL SYSTEM FOR TELEVISION RECEIVER

John N. Gortner, Rivera, and Calvin A. Sims, Maywood, Calif.

Application September 17, 1954, Serial No. 456,724

9 Claims. (Cl. 178—5.8)

This is a continuation-in-part of application Serial No. 367,168, filed July 10, 1953, now abandoned.

The present invention relates to a remote control system for television receivers, and more particularly to a device for controlling station selection, audio level and video quality of a television receiver from a remote location.

In the operation of present day television receivers, it is customary to select stations, adjust picture quality and audio volume at the television receiver, but normal viewing of the receiver occurs from a remote location. For example, viewing the television picture from a point across the room from the receiver is usually preferred since the quality of the picture appears more pleasing. It oftentimes happens that in adjusting the picture it is necessary to make an adjustment at the receiver then walk back and view it to determine whether further adjustments are to be made. This necessitates repeated individual adjustments of the receiver until a pleasing and proper picture is obtained.

In some receivers, picture quality will deteriorate after a period of time, whereupon it becomes necessary to walk over to the receiver and make the necessary adjustments for improving the quality. The same is true with audio volume.

Unlike conventional radios, it is customary to enjoy the operation of a television receiver at a point remote therefrom, whereupon it becomes desirable to be able to tune the receiver from the viewing position.

In view of the foregoing, it is an object of this invention to provide a remote control system for television receivers whereby station selection, audio level and video quality of the receiver from a remote point may be controlled.

It is another object of this invention to provide a remote control device for controlling the operation of a television receiver from a remote point, which is simple in construction and operation and requires a minimum of connections between the device and the television receiver.

It is another object of this invention to provide a remote control system for television receivers which incorporates a single remote control device and a single conductor cable leading from this device to the television receiver.

It is still another object of this invention to provide a unique method for controlling alternatively station selection, picture quality, and audio level of a television receiver from a single remote point.

Other objects will become apparent as the description proceeds.

In accordance with the present invention there is provided a remote control system which comprises a station-selecting device, an audio volume control and a contrast control contained in a single remote control unit which is coupled to the television receiver by means of a single two-conductor cable. The station-selecting device is a conventional television receiver radio frequency tuner which delivers an intermediate frequency signal to the cable. This signal is conveyed by the cable to the receiver intermediate frequency amplifier and conventionally utilized thereby for driving the succeeding receiver circuits. An inductor presenting a high impedance to video signals and a low impedance to audio signals is serially connected between the receiver volume control and the receiver end of the aforesaid cable, and a second similar inductor is coupled between the opposite end of the cable through a potentiometer to ground or effectively in shunt to the aforesaid receiver volume control. This potentiometer constitutes the remote audio volume control and is effectively isolated from the video signals appearing on said cable by the two inductors. Thus the same cable handles both audio and video frequencies which may be independently controlled at the remote control unit to select different television channels and to adjust both audio and picture contrast levels. Contrast adjustment is obtained by varying the gain of the tuner.

To the accomplishment of the above and related objects, our invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
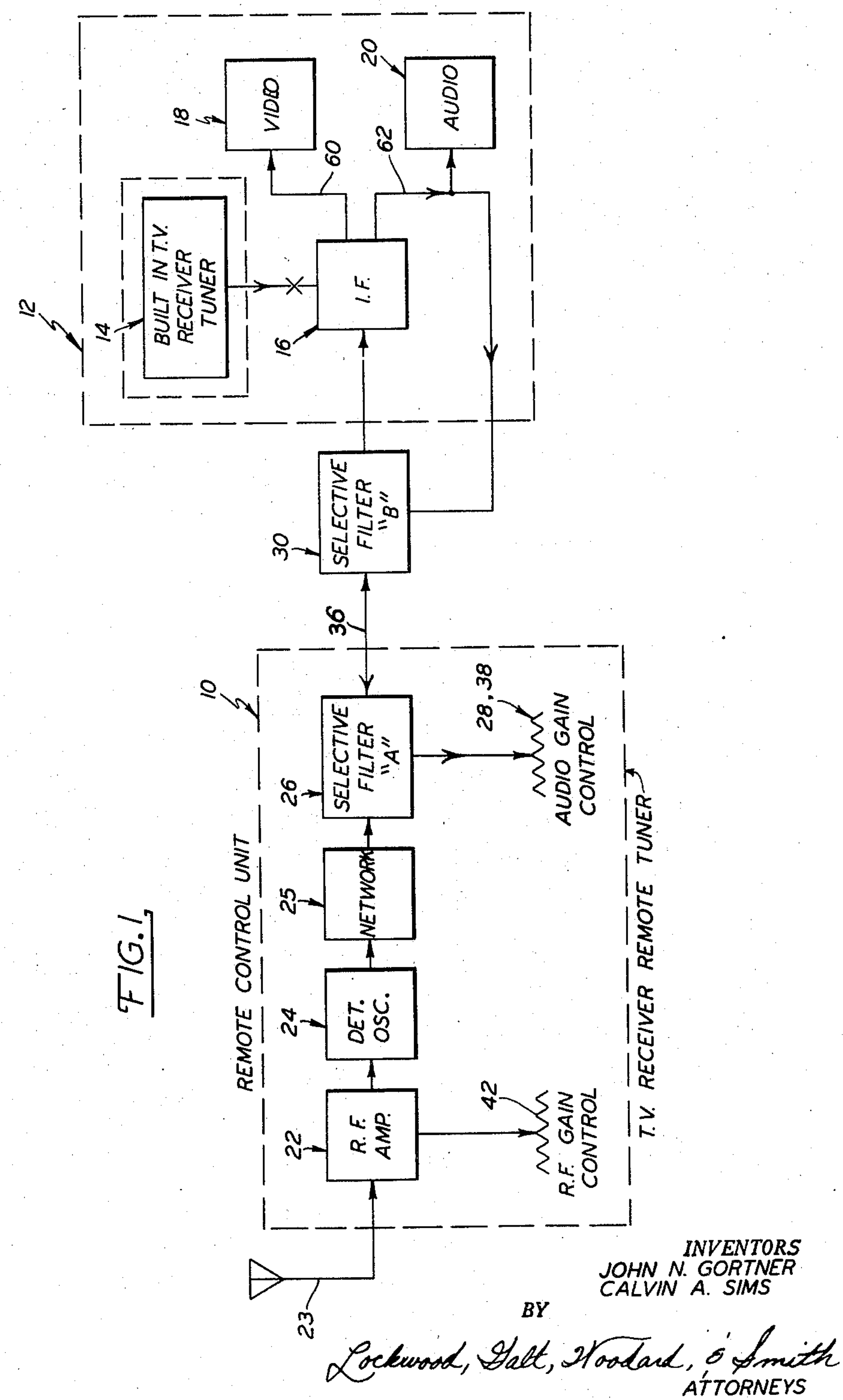
Fig. 1 is a block diagram of an embodiment of this invention.

Referring to the drawings, and more particularly to Fig. 1, the dashed line block indicated generally by the reference numeral 10 constitutes the remote control unit or device of this invention, and in operation is located at a point remote from the television receiver.

The television receiver, which is of conventional design, is indicated by the reference numeral 12, and includes the usual well-known circuits such as the R.F. tuner 14, I.F. amplifiers 16, and the video and audio circuits 18 and 20, respectively. The tuner 14 usually comprises a radio frequency amplifier and detector-oscillator circuits for producing the usual intermediate frequency signal which is fed to the intermediate frequency amplifiers 16 for amplification and distribution to the video and audio circuits 18 and 20.

In general, the remote control unit 10 serves as substitute equipment for the tuner 14, as will be explained more fully hereinafter.

This remote control unit 10 comprises essentially an R.F. amplifier 22 and suitable detector-oscillator circuits 24 which supply an intermediate frequency signal in much the same manner as do the equivalent parts of the tuner 14. These circuits 22, 24 together constitute the usual television receiver VHF tuner which is operated to select different channels and to supply the usual intermediate frequency signal to the receiver intermediate frequency amplifier strip. Such a tuner is conventionally incorporated in almost all current television receiver designs as an integral subassembly which constitutes a separate item of manufacture. The Capehart receiver models CX36 and CX37, manufactured by the Capehart-Farnsworth Company, a Division of International Telephone and Telegraph Corporation, and disclosed in volume 12 of Rider's Television Manual on pages 12—7, 12—18 and 12—19, utilize such a tuner for selecting different channels and for providing an intermediate frequency signal of, for example, 40 megacycles. While this particular tuner 22, 24 may be incorporated in the remote control unit 10, it will appear obvious to a person skilled in the art that any radio frequency tuning apparatus which delivers an intermediate frequency signal of suitable frequency, for example 40 megacycles, may be used instead. Included additionally within the unit 10 is a selective filter 26 which is so designed as to separate the intermediate frequency signals delivered by the circuitry 24 from audio signals derived from the receiver 12. An audio gain control, of conventional design and indicated by the reference numeral 28, is operatively coupled to the filter 26 for a purpose and in a manner to be described in more detail in the following. A suitable impedance matching network 25 serves to couple the detector-oscillator 24 to the filter 26.

Another selector filter 30, substantially identical in design to the filter 26, is operatively coupled to the latter and has a conneciton leading to the input side of the intermediate frequency amplifier 16 of the receiver 12 in place of the usual connection between the tuner 14 and the intermediate frequency amplifier 16. As will be seen in the drawings, the connection between the tuner 14 and the intermediate frequency amplifier 16 is broken at the point indicated by "X." Instead of this particular method of disabling the connection therebetween, the tuner 14 may be disabled in some other manner, such as by removing the tubes therefrom. Any method of disabling the tuner may be used without violating the scope of this invention.

Another connection from the selective filter 30 is made to the input side of the audio system 20, the detailed arrangement of this coupling being explained in the following.

Figure 2:
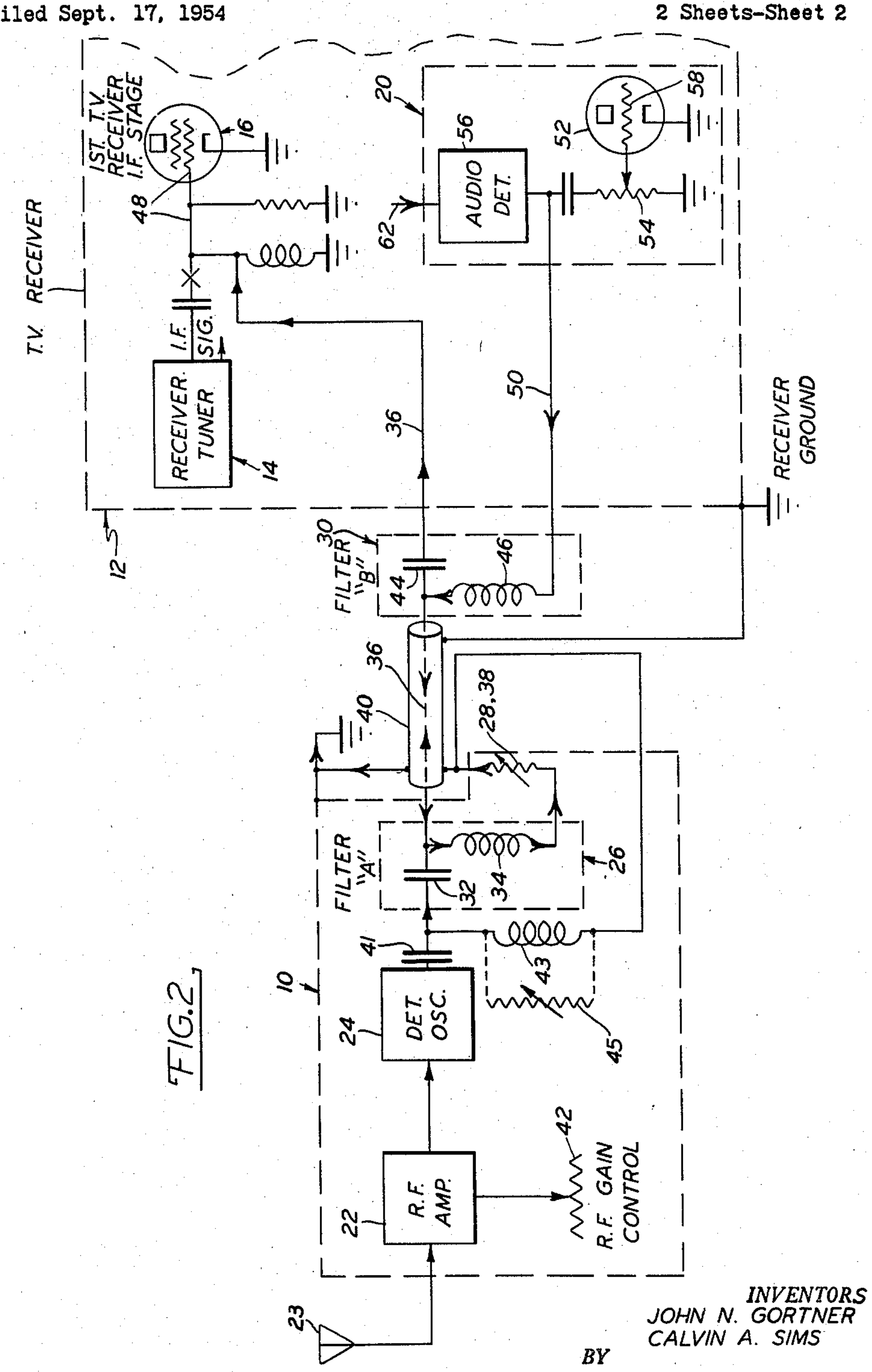
Fig. 2 is a circuit diagram thereof.

Referring now to Fig. 2 for a more detailed description of the circuitry of Fig. 1, the filter 26 is comprised of a condenser 32 and an inductor 34, the condenser 32 being connected in series with the single conductor cable 36 which leads from the output side of the detector-oscillator 24. The inductor 34 has one end connected to the cable 36 on the side opposite the detector-oscillator 24 and the other end connected to a conventional volume control 38 grounded by means of a connection to the shield or ground return 40 of the cable 36. Preferably, the left-hand end of the shield 40 is grounded to the chassis of the remote control tuner 10 for a purpose which will appear obvious to a person skilled in the art. The network 25 comprises a condenser 41 series connected between detector-oscillator 24 and condenser 32, and an inductor 43 connected between the junction of condensers 32, 41 and ground.

Control and adjustment of picture quality are accomplished by regulating the gain of the R.F. amplifier 22 in any manner well known to the art. Any suitable means may be utilized for accomplishing this purpose, such as the ordinary volume control or variable resistance 42 connected into the cathode circuit of the R.F. amplifier 22.

This R.F. amplifier 22 detector-oscillator 24 combination may further be provided with tuning mechanism for selecting different television channels as well as to provide fine tuning of these channels.

Filter 30 is comprised of a condenser 44 and an inductor 46, the condenser 44 being substantially identical to the condenser 32, and the inductor 46 being substantially identical to the inductor 34. The condenser 44 is connected in series with the single conductor 36, while the inductor 46 has one end connected to the conductor 36 on the side of the condenser 44 adjacent the condenser 32.

In the television receiver, the line 36 couples into the grid circuit 48 of the first I.F. stage 16 in place of the usual connection from the receiver tuner 14. This connection is preferably made to the first television receiver intermediate frequency amplifier stage, and since almost all television receivers on the market today utilize substantially identical intermediate frequency amplifier arrangements, any mechanic or technician having skill in servicing television receiving equipment can make this substitution.

The lower end of inductor 46 is connected by means of a wire 50 to the audio input side of the audio amplifier indicated by the reference numeral 52. The volume control 54 is the one permanently installed in the receiver 12 and usually consists of a resistance having one end connected to the signal output side of the audio detector 56 and the other end grounded. The variable arm of the control 54 is normally adjustable to apply the desired amount of signal voltage to the grid 58 of the tube 52 in order to obtain a corresponding audio level. The volume control 54 need not be disturbed in making the connection of the remote control unit 10 to the receiver 12 and is preferably turned to a point of maximum audio gain during remote control operation.

The single conductor cable 36, 40 may be of any conventional type currently available on the open market, and constitutes the only connection between the remote control unit 10 and the receiver 12. Ordinarily, the television receiver 12 will be located on one side of the room, and the remote control unit 10 will be situated on the opposite side of the room adjacent an arm chair. This single wire cable, therefore, constitutes an important feature by reason of the fact that complicated, bulky or expensive connections, which must span the distance between the two units, are obviated.

In operation, the R.F. amplifier 22 and the detector-oscillator 24 serve to convert a selected video signal from the antenna 23 into an intermediate frequency signal which is applied to the conductor 36. The size of the condenser 32 is so selected that it will have very little impedance at the frequency of this intermediate signal whereby the latter signal will be conducted along the conductor 36 through the similar condenser 44 to the grid of the first tube in the intermediate frequency amplifier 16. As explained earlier, the condenser 44 is substantially identical in design to that of the condenser 32.

Both inductors 34 and 46 are designed to have high or infinite impedance at these intermediate frequencies but relatively low impedance at audio frequencies. The signal fed by means of conductor 36 to the I.F. amplifiers 16 is utilized in the usual manner and is finally separated into two channels, one channel 60 (Fig. 1) leading to the video circuits 18 and the other channel 62 leading to the audio circuits 20. The usual audio signal from the detector 56 (Fig. 2) is conducted by means of line 50 and the inductor 46 to the cable conductor 36. Both condensers 32 and 44 presenting high impedances to these audio frequencies, the audio signal path will continue toward the left through cable 36 through inductor 34 and volume control 28, 38.

From this explanation, it will be seen that the volume control 38 is, in effect, shunted across the receiver volume control 54 whereby the level of audio signal applied to the grid 58 of the audio tube 52 may be varied for adjusting volume.

The components 41 and 43 of the matching network 25 are preferably so selected that inductor 43 has an impedance approximately equal to the surge impedance of the line 36, 40 at the receiver intermediate frequency, and condenser 41 resonates with inductor 43 at the same frequency. The "Q" of this network 41, 43 is designed to be low for maintaining losses at the I.F. band pass frequency at a minimum. Since condenser 41 and inductor 43 are resonant, the voltage appearing across inductor 43 will be greater than that appearing across both the condenser and inductor 41, 43 thereby providing gain simultaneously with the provision of an impedance match.

This particular matching network 25 also provides a means for controlling contrast of the receiver picture as an alternative or in addition to the gain control 42. By connecting a variable resistor 45, as shown by the dashed lines in Fig. 2, across the inductor 43, a reduction in "snow" is achieved in relatively weak television signal areas.

It is apparent that channel selection, picture quality, and audio level, as well as fine tuning in selection of the channel, may be controlled from a remote point by the remote control unit 10, all of these adjustments being made over the single coupling cable 36, 40. Picture quality is controlled by adjustment of the R.F. gain control 42 or any other suitable device utilized to vary the amplitude of the television signal derived from the tuner 22, 24. Channel selection is provided by the usual tuning mechanism associated with R.F. amplifiers, and audio volume is adjusted by simply varying the resistance of the volume control 38. By proper design of the two selective filters 26 and 30, the intermediate frequency signals are maintained separate from the audio signals. In Fig. 2 the paths of these two signals, respectively, are indicated by the solid and open arrows. The condenser 44 prevents audio signals from being applied to the grid circuit 48 of the first I.F. stage 16, while the inductor 46 prevents the high frequency video signals on the cable 36 from passing through the grid 58 of the first audio amplifier 52. A similar action takes place in filter 26 which effectively provides a shunt path to ground for the audio signals only.

Preferably, a separate power supply (not shown) is incorporated within the remote control unit 10 to power the tuner 22, 24, whereby it is not necessary to couple either "B+" supply or filament power from the main receiver chassis 12 thereto. Thus, complete operation of the entire system from a point remotely located with respect to the receiver 12 can be achieved by use of the single conductor coaxial cable 36, 40.

While it will be understood that the circuit specifications of the remote control system of this invention may vary according to the design for any particular application, the following circuit specifications for a remote control system are included, by way of example only, as suitable for utilization in operating any conventional television receiver now commercially available.

Since some receivers utilize a 24 megacycle I.F. frequency and others utilize a 40 megacycle I.F. frequency, suitable preadjustment of the detector-oscillator 24 must necessarily be made in order to produce the necessary intermediate frequency signal. While only two intermediate frequency signals are mentioned in the foregoing and suitable circuit specifications for such frequencies given hereinafter, it will appear as obvious to a person skilled in the art that the present invention may be adapted to any given intermediate frequency signal specification by making suitable adjustments and changes in component parameters.

*Circuit specifications*

| | |
|---|---|
| Condenser **32** | 100 mmfd. |
| Inductor **34** | 5.6 mh. |
| Volume control **38** | 100,000 ohms logrithmic taper. |
| Condenser **44** | 100 mmfd. |
| Inductor **46** | 5.6 mh. |

What is claimed is:

1. A system for controlling the operation of a television receiver from a remote point comprising a remote control unit having means for generating an intermediate frequency television output signal, a gain control means coupled to said means for generating said intermediate frequency signal for varying said output signal thereof, a two conductor cable operatively coupled to the output of said control unit adapted to carry said output signal to a remotely located receiver, audio signal-barrier means in series with said cable adjacent said control unit for impeding the communication of audio signals from said cable back into said control unit, intermediate frequency signal-barrier means operatively connected to said cable on the side of said audio signal-barrier means opposite said control unit, and audio frequency volume control means in said control unit operatively connected to said intermediate frequency signal-barrier means and adapted to vary an audio signal transmitted thereto from a television receiver thereby to control the volume of the television receiver.

2. A system for controlling the operation of a television receiver from a remote point comprising a remote control unit having means for generating an intermediate television frequency output signal, gain control means including means coupled to said means for generating an intermediate frequency signal for varying the output signal thereof, means including a single conductor cable and a ground return conductor adapted to conduct the output of said control unit to a remotely located television receiver, impedance means including a first condenser connected in series with said cable and located adjacent said control unit, said condenser having a low impedance to intermediate frequency signals and a high impedance to audio frequencies, impedance means including a first inductor having one end connected to said cable adjacent said condenser on the side thereof remote from said control unit, said inductor having high impedance to said intermediate frequency signals and low impedance to audio frequencies, volume control means in said control unit connected to said inductor, impedance means including a second condenser similar to said first condenser connected in series with said cable adjacent the end thereof remote from said control unit, and impedance means including a second inductor similar to said first inductor having one end connected to said cable between said condensers at a point adjacent said second condenser, the other end of said second inductor being adapted for connection to the audio system of said television receiver to feed a low frequency signal to said first mentioned volume control means in said control unit for regulation thereby.

3. A system for controlling the operation of a television receiver from a remote control station comprising a remote control tuning unit operable to produce a television picture intermediate frequency signal, a single conductor cable and ground return extending from the output of said control unit to carry the signals produced by said control unit to the intermediate frequency input of a remotely located receiver, a first condenser connected in series with said cable and located adjacent the output of said unit control and having a low impedance to said intermediate frequency signal and a high impedance to audio frequencies, a second condenser similar to said first condenser connected in series with said cable at the end thereof remote from said first condenser, a first inductor having one end connected to said cable between said condensers at a point adjacent said first condenser, said inductor having a high impedance to video signal and low impedance to audio frequencies, a volume control means operatively connected between the other end of said inductor and said ground return for varying the level of audio signals appearing on said cable, and a second inductor similar to said first inductor having one end connected to said cable between said condensers at a point adjacent said second condenser, the other end of said inductor being adapted for connection to the audio system of said television receiver to transmit an audio signal from the latter to said control unit for regulation by said volume control in said control unit.

4. A system for controlling from a remote point the operation of a television receiver of the type having a volume control in the audio output circuit thereof, said system comprising a remote control unit having a two conductor transmission line extending from the output thereof and adapted to be operatively connected to a television receiver to be controlled thereby, said control unit including means for producing an intermediate frequency signal including adjustable means for varying the gain of said signal, first means connected in series with one of said conductors for conducting said intermediate frequency signal to said receiver and for presenting a high impedance to audio frequency signals, second means operatively coupled across said two conductors on the side of said first means opposite said control unit and at a point adjacent said control unit, said second means presenting a high impedance to said intermediate frequency signal and a low impedance to said audio frequency signal, third means operatively coupled between one of said conductors and the volume control in the audio output circuit of a television receiver at a point adjacent said television receiver, said third means presenting a high impedance to said intermediate frequency signal and low impedance to audio frequency signals, and audio volume control means at said control unit operatively connected to said second means for altering the level of the detected audio signal which is conducted by said two conductor circuit to said control unit.

5. A system for controlling from a remote point the operation of a television receiver of the type having a volume control in the audio output circuit thereof, said system comprising a remote control tuning unit operable to produce a television intermediate frequency signal, a two conductor cable connected to the output of said control unit to carry the signal produced by said control unit to a remotely located receiver, a first condenser connected in series with one of said conductors at a point adjacent said control unit and having a low impedance to said control unit signal and a high impedance to audio frequencies, a first inductor having one end connected to said one conductor on the side of said condenser remote from said control unit, said inductor having high impedance to said control unit signal and low impedance to audio frequencies, a volume control operatively connected between the other end of said first inductor and said other conductor adjacent said control unit, a second condenser similar to said first condenser connected in series with said one conductor at the end thereof remote from said first condenser, and a second inductor similar to said first inductor having one of its ends connected to said one conductor on the side of said second condenser adjacent said first condenser and its other end adapted to be connected to the volume control in the audio circuit of said television receiver.

6. For use with a television receiver having video and audio circuits which generate, respectively, separated video and audio signals; a control unit for controlling and tuning said receiver from a remote control station including means for receiving a composite television signal and generating an intermediate frequency signal composed of both video and audio signals, said control unit having an output circuit, a two conductor cable including means coupling one end thereof to said output circuit of said control unit and including means at the other ends thereof for coupling said conductors to said video and audio circuits respectively and operable to transmit said intermediate frequency signal from said control unit to the video circuit of said television receiver and the audio signals generated in the audio circuit of said television receiver to said control unit, a first and a second impedance included in series with one of said conductors at the opposite ends thereof and each having a low impedance to said intermediate frequency signal and high impedance to audio frequencies, a third impedance coupled between said conductors on the side of said first impedance opposite said control unit, said third impedance having a high impedance to said intermediate frequency signal and a low impedance at audio frequencies, a volume control means at said control unit operatively coupled through said cable conductors to the audio circuit of said television receiver for controlling the level of the audio signal applied to said third impedance, and a fourth impedance similar to said third impedance coupled to said one conductor at the end of said cable remote from said control unit and adapted to be coupled to the audio circuit of said television receiver to thereby impress audio signals on said conductor, the coupling between said fourth impedance and said one conductor being between said first and second impedances at a point adjacent said second impedance.

7. The invention as defined in claim 6 wherein said first and second impedances are capacitors and said third and fourth impedances are inductors.

8. For use with a television receiver of the type having video and audio circuits for generating distinct video and audio signals; a remote control unit for controlling said receiver and having means for receiving a composite video signal and generating therefrom an intermediate frequency signal including both video and audio signals, said control unit having an output circuit connected to the intermediate frequency circuit of said receiving means, a two conductor cable coupled at one end to said output circuit and adapted to be coupled at the other end thereof to said video and audio circuits respectively of a television receiver, first and second impedances coupled in series with one of said conductors adjacent the opposite ends thereof having low impedance to said intermediate frequency signal and high impedance to audio frequencies, a third impedance coupled to said one conductor closely adjacent said first impedance but on the remote side thereof relative to said signal receiving means, said third impedance having a high impedance to said intermediate frequency signal and a low impedance at audio frequencies, an adjustable volume control means at said control unit coupled between said third impedance and the other of said two conductors, a fourth impedance similar to said third impedance and coupled to said one conductor at the end of said cable remote from said control unit, the coupling between said fourth impedance and said one conductor being at a point between said first and second impedances and adjacent said second impedance, and circuit means connecting said fourth impedance to said audio circuits of said television receiver to thereby impress audio signals on said conductors.

9. A system for controlling the operation of a television receiver from a remote point comprising a two conductor transmission line having first and second opposite ends, two capacitors coupled in series with one of the conductors at the opposite ends respectively, two inductors coupled at one end of each thereof to said one conductor adjacent said opposite ends respectively and adjacent the sides of the respective capacitors facing one another, said capacitors presenting a low impedance to a video signal and a high impedance to an audio signal, said inductors presenting a high impedance to a video signal and a low impedance to an audio signal, a remote control unit having an output circuit connected to said transmission line, an adjustable volume control means disposed adjacent said first end of said transmission line and coupled between the other end of the adjacent inductor and the other of said two conductors, and means at the second end of said transmission line for connecting a conductor to the volume control of a television receiver in such manner that the audio output signals thereof are adjustable by regulating said volume control at a remote point from said television receiver.

References Cited in the file of this patent

UNITED STATES PATENTS

| | | |
|---|---|---|
| 2,069,127 | Beers | Jan. 26, 1937 |
| 2,653,995 | Boyle | Sept. 29, 1953 |